United States Patent
Domanico

(10) Patent No.: US 10,144,243 B2
(45) Date of Patent: Dec. 4, 2018

(54) METHOD FOR CREATING SIMULATED TILE WALL

(71) Applicant: Luxury Bath Liners, Inc., Palatine, IL (US)

(72) Inventor: Mark Domanico, Glendale Heights, IL (US)

(73) Assignee: BCI Acrylic, Inc., Libertyville, IL (US)

( * ) Notice: Subject to any disclaimer, the term of this patent is extended or adjusted under 35 U.S.C. 154(b) by 215 days.

(21) Appl. No.: 15/046,864

(22) Filed: Feb. 18, 2016

(65) Prior Publication Data

US 2016/0236507 A1    Aug. 18, 2016

Related U.S. Application Data

(60) Provisional application No. 62/117,548, filed on Feb. 18, 2015.

(51) Int. Cl.
| | |
|---|---|
| *B44C 1/22* | (2006.01) |
| *G05B 19/4097* | (2006.01) |
| *B44C 5/04* | (2006.01) |
| *B44F 11/06* | (2006.01) |
| *E04F 13/18* | (2006.01) |

(52) U.S. Cl.
CPC ............... *B44C 1/22* (2013.01); *B44C 5/04* (2013.01); *B44F 11/06* (2013.01); *E04F 13/185* (2013.01); *G05B 19/4097* (2013.01); *G05B 2219/37355* (2013.01)

(58) Field of Classification Search
CPC ....... B44C 1/22; B28B 19/0053; B44F 11/06; G05B 2219/35142
See application file for complete search history.

(56) References Cited

U.S. PATENT DOCUMENTS 5,568,391 A * 10/1996 Mckee ............... B28B 11/044
                                                        700/122

* cited by examiner

*Primary Examiner* — Changhyun Yi
(74) *Attorney, Agent, or Firm* — Knechtel, Demeur & Samlan

(57) ABSTRACT

A method of manufacturing a tile sheet for a shower wall or bath enclosure in which a user designs a tile pattern which is stored in a database. An acrylic sheet is placed on a frame and clamped in place. A computer controlled router cuts grout lines in the acrylic sheet which simulates a tile pattern. The finished sheet having the tile pattern is cut and installed on a shower wall. Other designs can be stored in the computer and used to create different tile patterns using the same computer controlled router.

7 Claims, 6 Drawing Sheets

METHOD FOR CREATING SIMULATED TILE WALL

CROSS REFERENCE TO RELATED APPLICATION

This application is based on and claims the priority of U.S. provisional patent application Ser. No. 62/117,538 filed Feb. 18, 2015.

FIELD OF THE INVENTION

This invention relates to a method for creating a simulated tile wall that is often used in bathrooms and areas that generally require water resistant walls.

BACKGROUND OF THE INVENTION

Bathrooms, shower enclosures, bath tub enclosures and other damp rooms and enclosures often use ceramic tiles on the walls in order to protect the walls from moisture that would otherwise cause mildew, mold or otherwise ruin the wall. Ceramic tiles are generally expensive and time consuming to install. An alternative is to use ABS-backed acrylic sheets on the walls, which are less expensive to purchase and easier to install. However, the acrylic sheets do not have the desired appearance of a tile wall.

In the past, a simulated tile wall was created from an ABS-backed acrylic sheet. The acrylic sheet is typically placed into a clamp frame. The sheet is then slid into an oven where it is heated from above and below at different temperatures for a period of time, for example, for two to three minutes. Once the acrylic sheet is pliable, the sheet is removed from the oven, and slid over a mold having the simulated tile pattern. The mold is raised to the sheet, and a vacuum lever is pulled. The suction causes the heated sheet to form into the simulated pattern created on the mold. Once the sheet cools, it is removed from the clamp frame and exterior trim portions or edges are removed to form a finished acrylic sheet with the simulated tile pattern embedded in the sheet. This entire process typically takes about ten minutes, and requires highly trained individuals to complete the task with very little margin for error. Depending on the mold, different tile patterns can be formed.

While the previous process is satisfactory to form a simulated tile pattern, it has several shortcomings. For example, the process requires an operator with highly developed skills in operating the machinery and the necessity for accuracy when placing and forming the sheet. Furthermore, each tile pattern or sheet design requires a specific mold which has to be created. Creating the molds is very time consuming and costly.

Therefore, there is a need for a method for creating simulated tile sheets which are fully customizable, without the need to create multiple molds, and which can be easily created in a short amount of time without the requirement of highly skilled individuals.

SUMMARY OF THE INVENTION

The present invention is directed to a device and method for creating a simulated tile sheet from a sheet of acrylic.

The present method does not use heat to heat the sheet of acrylic, does not require molds, and does not use a vacuum. The present invention utilizes a robotic arm and/or a CNC router to engrave tile lines in a sheet of ABS-backed acrylic or other material. The resulting tile sheet is more realistic looking, and more customizable, as the pattern formed by the router may be easily and quickly selected on a sheet by sheet basis.

DESCRIPTION OF THE PREFERRED EMBODIMENT

Figure 1:
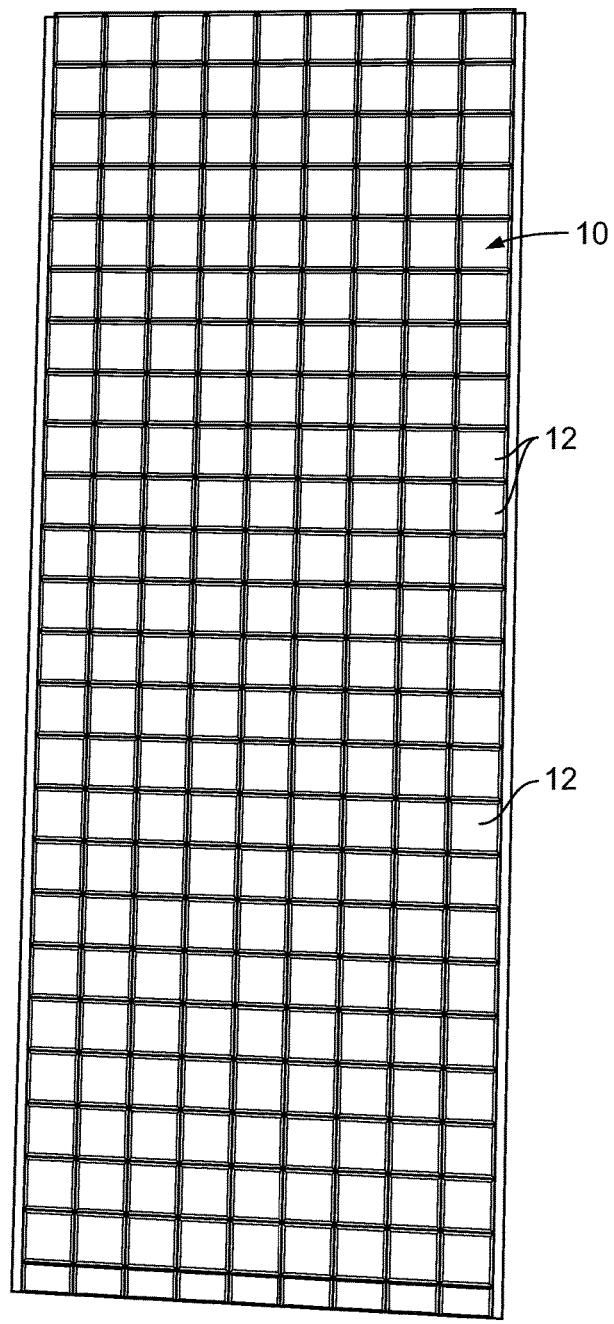
FIG. 1 is an illustration of a sheet of acrylic with simulated tiles formed by the prior art method of heating a sheet and forming it in a mold.

FIG. 1 illustrates a sheet of acrylic that has the simulated tiles formed by the prior art process in which a sheet of acrylic 10 is place on a frame, heated in an oven, placed against a mold and then a vacuum is drawn between the sheet and the mold. The heated sheet of acrylic takes the form of the mold, which in this case is a simulated sheet with individual tiles 12.

Figure 2:
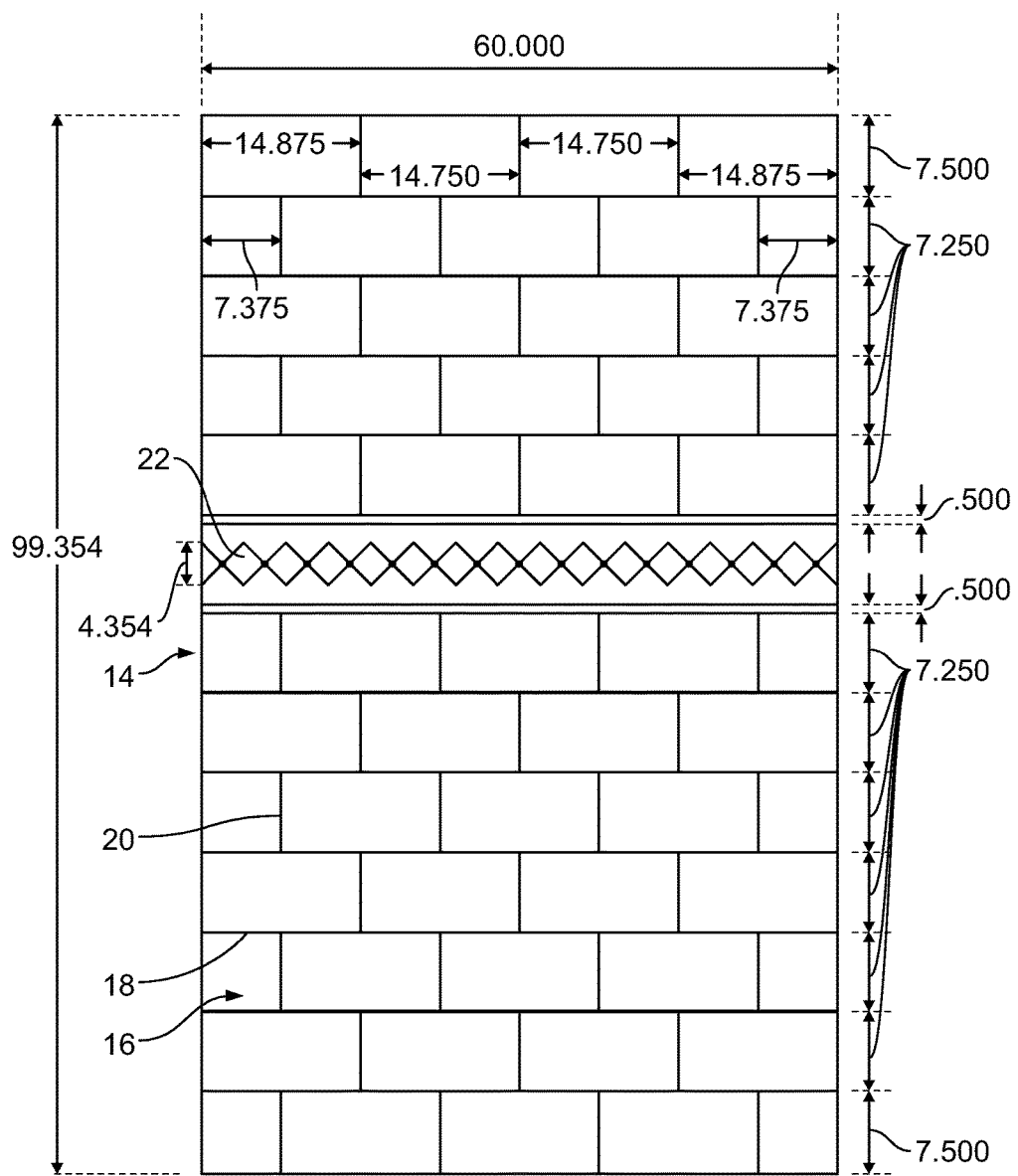
FIG. 2 is a diagram of a tile pattern to be created on a sheet of acrylic.

The inventive method is clearly illustrated in FIGS. 2-6. The first step in the process of forming an acrylic tile sheet 13 using the present method is to produce a three-dimensional model 14 of a new tile pattern 16. This tile pattern may take any desired form, but it most often will resemble a tile pattern that is commonly used in bathrooms in a shower or bath tub. The sheet 13 may be of any color and may have embedded in it any relief or designs as the user desires that can be accommodated in a sheet of ABS-backed acrylic. The sheet 13 may be of any acrylic or similar material that will function as a protective sheet of material in a wet environment. As seen in FIG. 2 the tile pattern 16 has horizontal grout lines 18, vertical grout lines 20 and diagonal grout lines 22. Once the pattern 16 is designed, it is scaled or adapted to match a particular size or shape, for example a sheet of acrylic 60 by 40 inches for placement on a wall above a bath tub.

Figure 3:
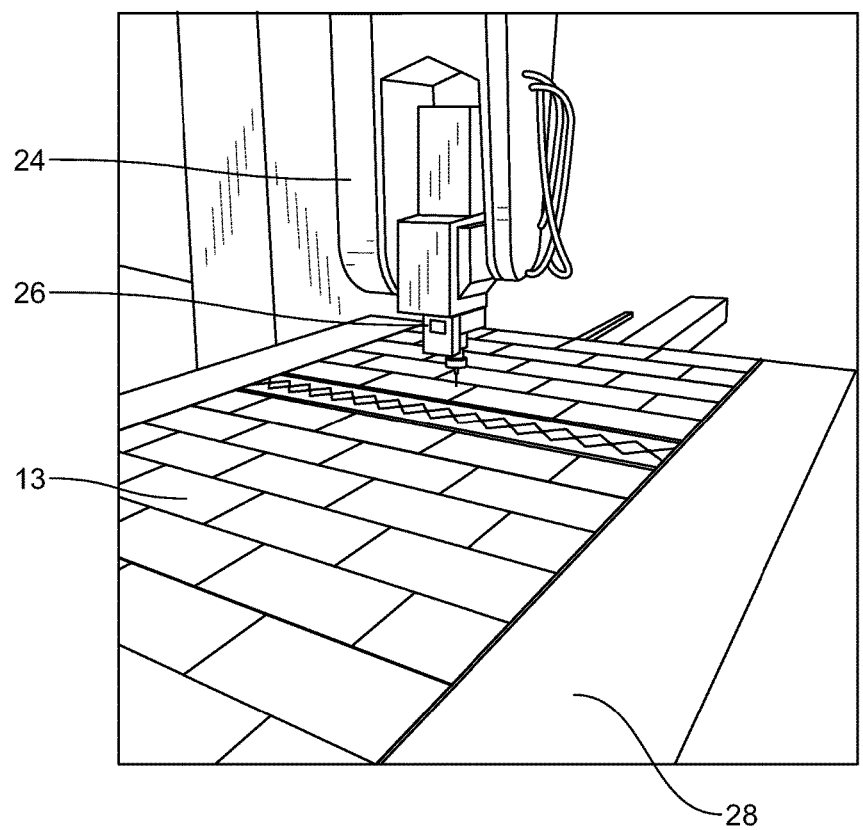
FIG. 3 is diagram of a sheet of ABS-backed acrylic placed on a cutting table and anchored in place.
Figure 4:
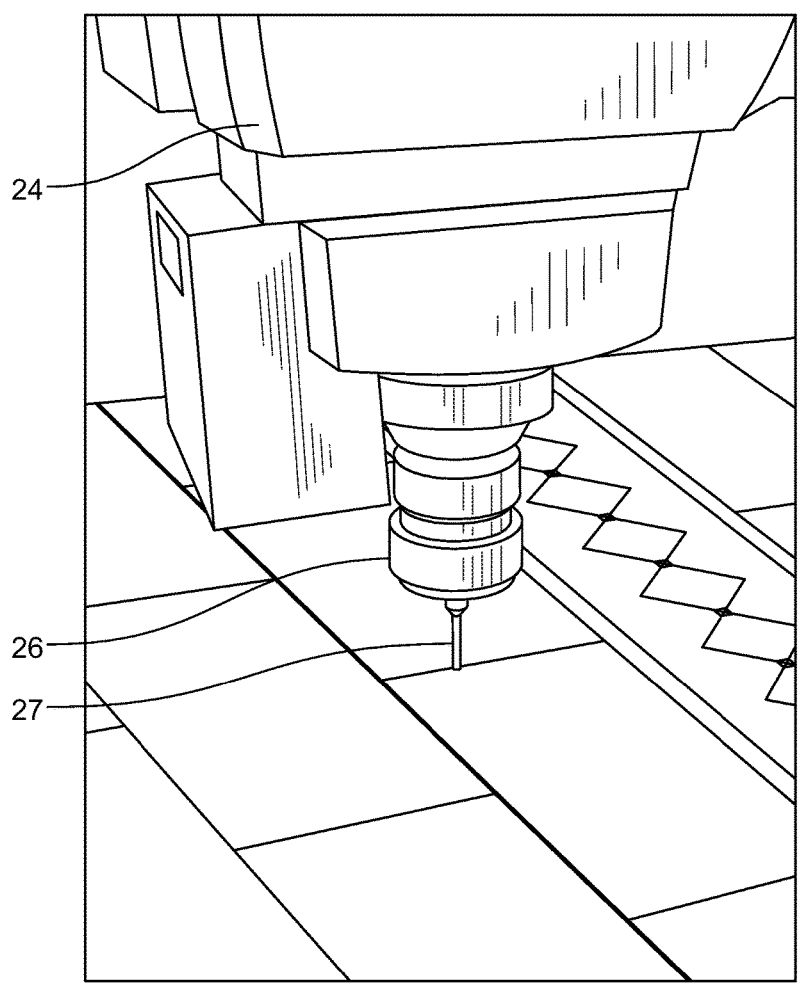
FIG. 4 is a diagram of the robotic arm as it starts to make incisions into the sheet simulating the grout lines around a ceramic tile.
Figure 5:
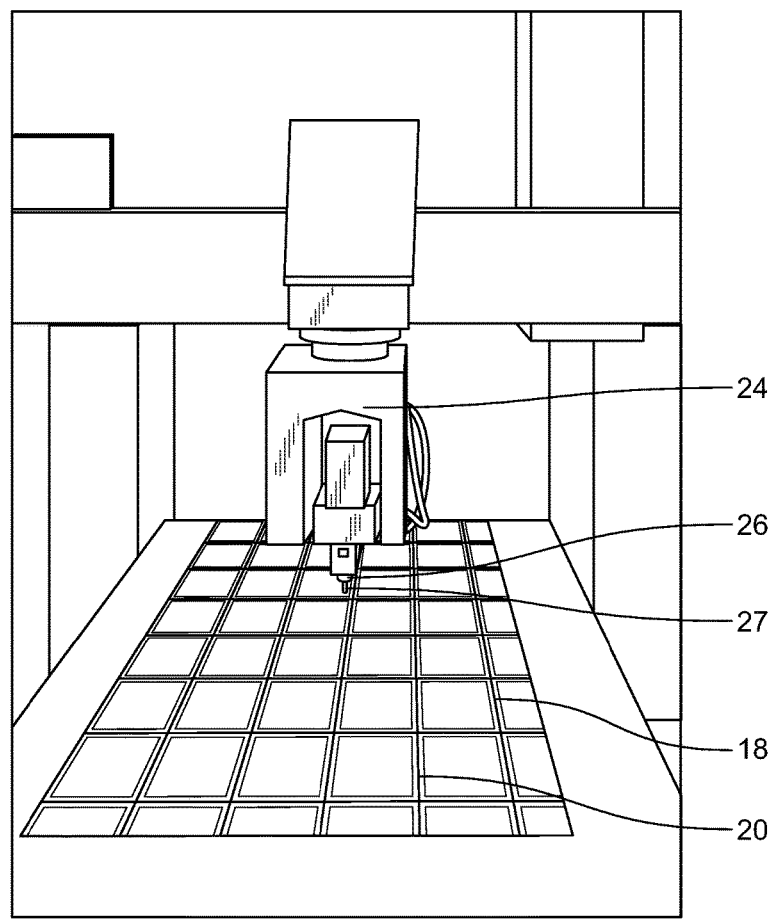
FIG. 5 is a diagram of the cutting tool as it cuts the incisions in two directions perpendicular to each other.
Figure 6:
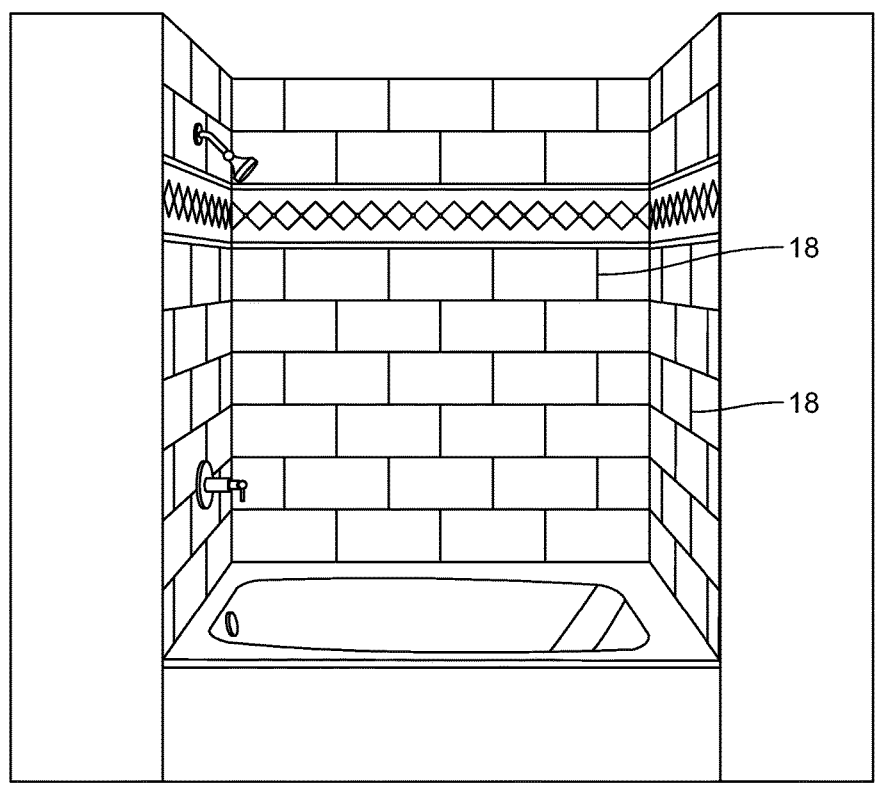
FIG. 6 is a diagram of a finished wall installed in a bath enclosure.

In order to create the acrylic sheet 13, the designer creates a file within a computer used to control a robotic arm 24 connected to a router 26 having a router bit 27 mounted in it. For each design a new tile pattern 16 is named, created and stored. AS seen in FIG. 3, a new sheet of ABS-backed acrylic 13, or other material that will meet the needs of the application in a bath enclosure, may then be straightened and anchored on a cutting table 28 proximate the router 26. The designed pattern 16 may then be programmed or entered into the computer (not illustrated) which runs a program used to control the robotic arm 24 and router 26 and create the pattern 16 on the sheet 13. As seen in FIGS. 4 and 5, the router bit 27 begins by making incisions into the sheet 13 to simulate the grout lines around each tile. The amount of material removed from the sheet 13 is relatively small, generally in the order of 0.005 inches. The lines cut on the sheet 13 are in a manner which simulates a tiled wall such as illustrated in FIG. 6. Each tile sheet may be created in approximately seven to ten minutes depending on the programmed design and size of the sheet. The router bit 27 is designed so that when it removes the material from the sheet 13, it leaves a rounded edge between the simulated tile pattern 16 and the grout line 18. Otherwise at the intersection of the tile and the grout line there would be a sharp edge which is undesirable.

Once all the lines from the tile design 16 that was programmed into the computer are made on the sheet 13, the program is complete and the sheet 13 as cut is ready for use. The computer and router 26 may then be used to create a second sheet of a substantially matching tile sheet 13, or may be reprogrammed to create a completely different designed tile sheet. Since any completed tile sheet designs are stored within the computer, in the future any previously made tile sheet may be duplicated simply by accessing the programmed design pattern. By utilizing the computer and controlled router, seemingly unlimited numbers of patterns are available to a tile sheet manufacturer without the need to create and store multiple molds. The need to move molds in and out is also eliminated each time a different pattern for a tile sheet is desired insofar as the router 16 and computer store and create the patterns rather than a mold.

Once the acrylic sheet 13 is completed, it can be cut to the proper size to be mounted in an enclosure such as illustrated in FIG. 6. Each sheet 13 forms one of the interior walls of the bath enclosure. As seen in FIG. 6 all the horizontal grout lines 18 line up so that it gives the appearance of real tiles.

Thus, there has been provided a method for manufacturing a simulated tile wall that provides for limitless customization. While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the claims.

What is claimed is:

1. A method of manufacturing a simulated tile sheet for a shower wall enclosure comprising the steps of:
   a. determining a first set of tile pattern characteristics comprising the steps of:
      i. determining a first set of tile shapes,
      ii. determining an orientation of the first set of tile shapes on the simulated tile sheet,
      iii. determining a first set of tile dimensions,
      iv. determining a depth of cut in the simulated tile sheet,
   b. entering the first set of tile pattern characteristics into a computer and storing the first set of tile pattern characteristics digitally in a database in a computer controlled material removal tool;
   c. selecting a first sheet of acrylic material based on the first set of tile pattern characteristics, the first sheet of acrylic material having a top displayed surface;
   d. placing the first sheet of acrylic material below the computer controlled material removal tool;
   e. retrieving the first set of tile pattern characteristics stored in the database; and
   f. forming a first set of grout lines by removing from the top displayed surface of the first sheet of acrylic material by means of the computer controlled material removal tool a first predetermined amount of material based on the first set of tile pattern characteristics to create the first set of tile pattern characteristics in the first sheet of acrylic material.

2. The method of claim 1 and the further steps of:
   g. determining a second set of tile pattern characteristics comprising the steps of:
      i. determining a second depth of cut in the simulated tile sheet,
      ii. determining a second set of tile dimensions,
      iii. determining a second set of tile shapes,
      iv. determining an orientation of the second set of shapes on the simulated tile sheet,
   h. entering the second set of tile pattern characteristics into the computer and storing the second tile pattern characteristics digitally in the database in the computer controlled material removal tool;
   i. retrieving the second set of tile pattern characteristics from the database; and
   j. forming a second set of grout lines by removing from the top displayed surface of the first sheet of acrylic material by means of the computer controlled material removal tool a second predetermined amount of material based on the second set of tile pattern characteristics to create the second set of tile pattern characteristics in the first sheet of acrylic material.

3. The method of claim 1 wherein the computer controlled material removal tool is a computer controlled router.

4. The method of claim 1 wherein the grout lines simulate individual tiles.

5. The method of claim 4 wherein the grout lines are defined by rounded edges.

6. The method of claim 5 and the further step of forming the rounded edges of the grout lines by the material removal tool at the same time as the removal of the predetermined amount of material from the top displayed surface of the sheet of acrylic material.

7. The method of claim 1 wherein the predetermined amount of material removed from the top displayed surface is substantially 0.005 inches.

\* \* \* \* \*